United States Patent
Han et al.

(10) Patent No.: US 9,326,192 B2
(45) Date of Patent: Apr. 26, 2016

(54) METHOD FOR PROCESSING HANDOVER FAILURE, AND USER EQUIPMENT

(75) Inventors: Lifeng Han, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 157 days.

(21) Appl. No.: 13/825,015

(22) PCT Filed: Aug. 8, 2011

(86) PCT No.: PCT/CN2011/078110
§ 371 (c)(1),
(2), (4) Date: Mar. 18, 2013

(87) PCT Pub. No.: WO2012/037841
PCT Pub. Date: Mar. 29, 2012

(65) Prior Publication Data
US 2013/0183977 A1 Jul. 18, 2013

(30) Foreign Application Priority Data
Sep. 21, 2010 (CN) .......................... 2010 1 0298210

(51) Int. Cl.
*H04W 36/00* (2009.01)

(52) U.S. Cl.
CPC ...... *H04W 36/0005* (2013.01); *H04W 36/0055* (2013.01); *H04W 36/0061* (2013.01)

(58) Field of Classification Search
CPC ..... H04W 24/02; H04W 24/04; H04W 36/08; H04W 76/027; H04W 76/028; H04W 36/00; H04W 36/0055; H04W 36/0072
See application file for complete search history.

(56) References Cited

U.S. PATENT DOCUMENTS

| | | |
|---|---|---|
| 2008/0261600 A1 | 10/2008 | Somasundaram et al. |
| 2010/0165850 A1 | 7/2010 | Grob-Lipski et al. |
| 2010/0167744 A1 | 7/2010 | Grob-Lipski et al. |
| 2010/0173626 A1 | 7/2010 | Catovic et al. |

(Continued)

FOREIGN PATENT DOCUMENTS

| | | |
|---|---|---|
| CN | 101128057 A | 2/2008 |
| EP | 2 031 920 A1 | 3/2009 |
| JP | 2010-525753 A | 7/2010 |

(Continued)

OTHER PUBLICATIONS

International Search Report corresponding to International Patent Application No. PCT/CN2011/078110 dated Nov. 24, 2011.

(Continued)

*Primary Examiner* — Nam Huynh
(74) *Attorney, Agent, or Firm* — Jenkins, Wilson, Taylor & Hunt, P.A.

(57) ABSTRACT

The disclosure provides a method for processing handover failure, and user equipment (UE). The method comprises: UE failing in handing over from a first cell to a second cell; the UE failing in performing radio resource control (RRC) re-establishment in the first cell, the second cell or a third cell, and succeeding in performing RRC establishment in a fourth cell; a network element to which the user equipment in a connected state is connected sending a physical identifier of the second cell to a network element to which the first cell belongs. The disclosure can ensure that the network element to which the first cell belongs carries out accurate judgment of handover situations according to the physical identifier, which can ensure the optimization of handover parameters.

13 Claims, 4 Drawing Sheets

(56) References Cited

U.S. PATENT DOCUMENTS

2011/0300896 A1* 12/2011 Wang et al. .................. 455/524
2014/0194123 A1   7/2014 Wang et al.

FOREIGN PATENT DOCUMENTS

JP     2012-518923 A   8/2012
WO    2010/094236 A1  8/2010

OTHER PUBLICATIONS

Qualcomm Europe et al: "*Principles of MRO stage 3*", 3GPP Draft; R3-093017, 3rd Generation Partnership Project (3GPP), Mobile Competence Centre, 650, Route Deslucioles; F-06921 Sophia-Antipolis Cedex; France, no. Jeju; 0891189, Nov. 9, 2009, XP050392484,[retrieved on Nov. 19, 2009]* sections 2.1, 2.2, 2.3 *.

"3rd Generation Partnership Project; Technical Specification Group Radio Access Network; Evolved Universal Radio Access (E-UTRA) and Evolved Universal Terrestrial Radio Access Network (E-UTRAN); Overall description; Stage 2 (Release 10)," 3GPP Standard, 3GPP TS 36.300, 3rd Generation Partnership Project (3GPP), Mobile Competence Centre; 650; Route Des Lucioles; F-06921 Sophia-Ntipolis Cedex; France, no. V10.0.0., Jun. 17, 2010, pp. 1-183, P050441905, [retrieved on Jun. 17, 2010]* section 20.2.2.13, 22.4.2 *.
Supplementary European Search Report for Application No. EP 11 82 6368 dated Sep. 19, 2013.
Japanese Decision of Refusal for Application No. 2013-529538 dated Dec. 8, 2014.
Korean Written Decision on Registration for Application No. 10 2013 7007621 dated May 20, 2015.
Japanese Decision to Grant a Patent for Application No. 2013-529538 dated Jun. 24, 2015.

* cited by examiner

METHOD FOR PROCESSING HANDOVER FAILURE, AND USER EQUIPMENT

CROSS-REFERENCE TO RELATED APPLICATIONS

This application is filed under the provisions of 35 U.S.C. §371 and claims the priority of International Patent Application No. PCT/CN2011/078110 filed on Aug. 8, 2011, and of Chinese Patent Application No. 201010298210.5 filed on Sep. 21, 2010. The disclosures of the foregoing international patent application and Chinese patent application are hereby incorporated by reference herein in their respective entireties.

TECHNICAL FIELD

The disclosure relates to the communication field, and more specifically to a method for processing handover failure, and user equipment.

BACKGROUND

A Long-term Evolution (LTE) network, as a flat network, consists of an Evolved Universal Terrestrial Radio Access Network (E-UTRAN) and an Evolved Packet Core (EPC). The E-UTRAN comprises an aggregate of Evolved NodeBs (eNBs), each of which is coupled with the EPC via an S1 interface, and the eNBs can be coupled between each other via an X2 interface, wherein the S1 interface and the X2 interface are logical interfaces. One EPC can manage one or multiple eNBs, one eNB can be under control of multiple EPCs and one eNB can manage one or multiple cells.

A Self Organizing Network (SON) is a kind of technology that can conduct network configuration and optimization automatically. The technology features self-configuration and self-optimization, and its application in the LTE enables the eNB to configure network parameters automatically according to some measurement and perform optimization according to network changes automatically, thus keeping optimum network performance and saving a lot of manpower and material resources.

For the self-optimization of handover parameters of the LTE system, parameters related to cell reselection and handover are to be optimized as per a certain algorithm based on a network operation status and handover related measurement so as to improve performance of the network. The handover herein refers to intra-system and inter-system handover of the LTE, wherein the inter-system handover refers to the handover of a Universal Mobile Telecommunications System Radio Access Network (UTRAN), a Global System for Mobile communications (GSM) or a Code Division Multiple Access (ADMA) system.

In the network, the process that the terminal carries out the handover is described as follows. A network side makes a handover decision according to signal quality of a current cell and an adjacent cell reported by the terminal based on a certain handover algorithm, and notifies the terminal to perform a specific handover flow according to the handover decision. Improper handover parameter setting may lead to ping-pong handover, handover failure or radio link failure (RLF) which are all undesired handovers and may have negative effects on user experience.

When the RLF occurs, the User Equipment (UE) performs Radio Resource Control (RRC) re-establishment. The RRC re-establishment process performed when the RLF occurs to the UE will be detailed hereinafter in conjunction with FIG. 1 to FIG. 3.

FIG. 1 is a schematic diagram of a situation that the UE is too late to hand over from Cell b to Cell a according to the related art. As shown in FIG. 1, the RLF occurs to the UE in Cell b of eNB B, or a failure occurs when the UE hands over from Cell b to Cell a, and then the UE attempts to perform the RRC re-establishment in Cell a of eNB A. The above procedure indicates that the UE is too late to hand over from Cell b to Cell a.

FIG. 2 is a schematic diagram of a situation that the UE is too early to hand over from Cell a to Cell b according to the related art. As shown in FIG. 2, the RLF occurs to the UE in Cell b soon after the UE hands over from Cell a of eNB A to Cell b of eNB B, or a failure occurs when the UE hands over from Cell a to Cell b, and then the UE selects to perform the RRC re-establishment in Cell a, namely returns to a source cell before the handover to perform the RRC re-establishment. The above procedure indicates that the UE is too early to hand over from Cell a to Cell b.

FIG. 3 is a schematic diagram of a situation that the UE selects a wrong cell when handing over from Cell c to Cell b according to the related art. As shown in FIG. 3, the RLF occurs to the UE soon after the UE hands over from Cell c of eNB C to Cell b of eNB B, or a failure occurs when the UE hands over from Cell c to Cell b, and then the UE performs the RRC re-establishment in Cell a of eNB A, which indicates that Cell b of eNB B selected by eNB C is a wrong target cell, and the right one is Cell a, namely the UE should hand over from Cell c to Cell a directly.

In the processes of the handover failure above, the cells in which the handover is initiated and the cells in which the RLF occurs keep information of the UE for the RRC re-establishment. During the RRC re-establishment procedure above, the UE carries a UE-Identity, a Cell Radio Network Temporary Identifier (C-RNTI), a short Medium Access Control Integrity protection (short MAC-I) and a Physical Cell Identifier (PCI) in an RRC re-establishment request message. The C-RNTI is allocated by a source cell (the situation of the handover failure); or the C-RNTI is allocated by a cell triggering the RRC re-establishment (other situations). The PCI is a physical address of the source cell (the situation of the handover failure); or the PCI is a physical address of the cell triggering the RRC re-establishment (other situations). The short MAC-I is obtained by adopting a KRRCint key of the source cell (the situation of the handover failure) or the cell triggering the RRC re-establishment and an integrity protection algorithm, whose inputs are the C-RNTI, the PCI and a EUTRAN Cell Global Identifier (ECGI). It shall be noted that the C-RNTI and the PCI are carried by the RRC re-establishment request message above, and the ECGI is a cell identifier of a target cell selected by the UE during the RRC re-establishment.

Furthermore, when the UE performs the RRC re-establishment procedure, if the RRC re-establishment is unsuccessful, that is, the RRC re-establishment fails, then the UE switches into an idle (IDLE) state and waits to reselect another cell to perform the RRC establishment.

FIG. 4 is a schematic diagram of the processing of an RRC re-establishment failure according to the related art. As shown in FIG. 4, the RLF occurs to the UE in Cell 2, and then the UE attempts to perform the RRC re-establishment in Cell 1 and switches into the IDLE state after the attempt of performing the RRC re-establishment fails, at last the UE reselects Cell 3 and succeeds in performing the RRC establishment.

A judgment method for handover situations is that: after the RRC establishment succeeds, the UE is required to report one or multiple items of a cell global identifier of a cell where the RLF occurs to the UE, a cell global identifier of a cell where the first RRC re-establishment is attempted, a global identifier of a serving cell of the UE before the RLF occurs (optional), a time difference between the last handover and the first re-establishment attempt of the UE, RLF measurement information, etc., wherein the cell identifier herein refers to the ECGI of a cell. The base station 3, to which Cell 3 belongs, sends the related information above reported by the UE to the base station 2, to which Cell 2 where the RLF occurs to the UE belongs, and the base station 2 judges what kind of handover situation occurs based on the information, so as to conduct optimization. For example, the judgment method that can be adopted is described as follows. If the time difference reported by the UE does not exist or is greater than a set threshold, for instance, the threshold can be the time period of a timer for storing the UE context, it can be judged to be a situation of too late handover (Too Late HO). If the time difference reported by the UE is less than the set threshold and the cell where the UE conducts the first RRC re-establishment is the source cell of the previous handover of the UE, it can be judged to be a situation of too early handover (Too Early HO). If the time difference reported by the UE is less than the set threshold and the cell where the UE conducts the first RRC re-establishment is not the source cell or the target cell of the previous handover of the UE or the serving cell where the RLF occurs to the UE, it is judged to be a situation of handover to a wrong cell (HO to a Wrong Cell). For the failure during the handover, if the judgment method above is adopted, the base station 1 to which the cell (Cell 1), where the handover is initiated, belongs shall attempt to acquire the cell global identifier of the target cell (Cell 2) of the handover and RLF-related measurement information of the cell (Cell 2) where the RLF occurs. The RLF-related measurement information comprises measurement results of the signal quality of a best surrounding cell and a serving cell before the RLF occurs, wherein the measurement results of the signal quality are recorded by the UE. The RLF-related measurement information can also comprise measurement results of the signal quality of the serving cell and the best surrounding cell measured by the UE when the UE initiates the re-establishment subsequently, and location information of the UE.

However, the inventor found that the UE can not acquire the cell global identifier (which is ECGI in the E-UTRAN) of the target cell (Cell 2) of the handover when failure occurs during the handover procedure, which causes the base station 1 to which the cell (Cell 1), where the handover is initiated, belongs can not acquire the cell global identifier (which is ECGI in the E-UTRAN) of the cell where the RLF occurs, further causes the cell (Cell 1) where the handover is initiated can not carry accurate judgment of handover situations, and the optimization of handover parameters.

SUMMARY

The disclosure provides a method for processing handover failure, and user equipment to solve the problem that UE can not acquire a cell global identifier (which is ECGI in the E-UTRAN) of a second cell when failure occurs during a handover procedure, and therefore a base station to which a first cell belongs can not acquire the cell global identifier (which is ECGI in the E-UTRAN) of the second cell from the UE.

A method for processing handover failure is provided according to one aspect of the disclosure.

The method for processing handover failure according to the disclosure comprises: User Equipment (UE) failing in handing over from a first cell to a second cell; the UE failing in performing Radio Resource Control (RRC) re-establishment in the first cell, the second cell or a third cell, and succeeding in performing RRC establishment in a fourth cell; and a network element, to which the UE in a connected state is connected, sending a physical identifier of the second cell to a network element to which the first cell belongs.

The network element to which the UE in the connected state is connected sending the physical identifier of the second cell to the network element to which the first cell belongs comprises: the UE reporting the physical identifier of the second cell to a network element to which the fourth cell belongs; and the network element to which the fourth cell belongs sending the physical identifier of the second cell to the network element to which the first cell belongs.

The UE reports routing and addressing information of the first cell to the network element to which the fourth cell belongs, wherein when the first cell is a Long-Term Evolution (LTE) cell, the routing and addressing information comprises at least one of the following: a Global evolved NodeB Identifier (Global eNB ID) and a Tracking Area Identifier (TAI); when the first cell is a Universal Mobile Telecommunications System (UMTS) Frequency Division Duplex (FDD) cell, the routing and addressing information comprises at least one of the following: a Location Area Identifier (LAI), a Routing Area Code (RAC), a Radio Network Controller identifier (RNC-ID) and an Extended RNC-ID; when the first cell is a cell of a Global System of Mobile communications (GSM), the routing and addressing information is a Cell Global Identifier (CGI), wherein the CGI comprises at least one of the following: a Public Land Mobile Network (PLMN) identity, a Location Area Code (LAC), a Cell Identifier (CI) and an RAC.

The network element to which the UE in the connected state is connected sending the physical identifier of the second cell to the network element to which the first cell belongs comprises: the UE handing over from the fourth cell to a fifth cell; the UE reporting the physical identifier of the second cell to a network element to which the fifth cell belongs; and the network element to which the fifth cell belongs sending the physical identifier of the second cell to the network element to which the first cell belongs.

The UE reports routing and addressing information of the first cell to the network element to which the fifth cell belongs, wherein when the first cell is an LTE cell, the routing and addressing information comprises at least one of the following: a Global eNB ID and a TAI; when the first cell is a UMTS FDD cell, the routing and addressing information comprises at least one of the following: a LAI, a RAC, an RNC-ID and an Extended RNC-ID; when the first cell is a cell of a GSM, the routing and addressing information is a CGI, wherein the CGI comprises at least one of the following: a PLMN identity, an LAC, a CI and an RAC.

When the second cell is an LTE cell, the physical identifier of the second cell is a Physical Cell Identifier (PCI); when the second cell is a UMTS FDD cell, the physical identifier of the second cell is a Primary Scrambling Code (PSC); when the second cell is a UMTS Time Division Duplex (TDD) cell, the physical identifier of the second cell is a Cell Parameter Identifier (Cell Parameter ID); when the second cell is a cell of a GSM, the physical identifier of the second cell is a Base Station Identity Code (BSIC).

The UE in the connected state sends frequency information of the second cell to the network element to which the UE in the connected state is connected, and the network element to which the UE in the connected state is connected sends the frequency information of the second cell to the network element to which the first cell belongs.

The network element to which the UE in the connected state is connected comprises: a network element to which the fourth cell belongs; or, a network element to which a fifth cell belongs when the UE succeeds in handing over from the fourth cell to the fifth cell.

A network element is provided according to another aspect of the disclosure.

The network element according to the disclosure, to which User Equipment (UE) in a connected state is connected, is configured to send a Physical identifier of a second cell to a network element to which a first cell belongs.

The network element is configured to send the physical identifier of the second cell to the network element to which the first cell belongs in following conditions: the UE failing in handing over from the first cell to the second cell; and the UE failing in performing Radio Resource Control (RRC) re-establishment in the first cell, the second cell or a third cell, and succeeding in performing RRC establishment in a fourth cell.

The network element is configured to receive the Physical identifier of the second cell sent from the UE in the connected state, and send the physical identifier of the second cell to the network element to which the first cell belongs.

The network element is configured to receive frequency information of the second cell sent from the UE in the connected state, and send the frequency information of the second cell to the network element to which the first cell belongs.

The network element to which the UE in the connected state is connected comprises: a network element to which the fourth cell belongs; or, a network element to which a fifth cell belongs when the UE succeeds in handing over from the fourth cell to the fifth cell.

User Equipment (UE) is provided according to another aspect of the disclosure.

The UE according to the disclosure comprises: a first determination module, configured to determine that handover from a first cell to a second cell fails; a second determination module, configured to determine that Radio Resource Control (RRC) re-establishment in the first cell or the second cell or a third cell fails; a third determination module, configured to determine that RRC establishment in a fourth cell succeeds; and a sending module, configured to send a physical identifier of the second cell to a network element, to which the UE in a connected state is connected.

The sending module comprises: a first reporting sub-module, configured to report the physical identifier of the second cell to a network element to which the fourth cell belongs, so that the network element to which the fourth cell belongs sends the physical identifier of the second cell to the network element to which the first cell belongs; or, a second reporting sub-module, configured to report the physical identifier of the second cell to a network element to which a fifth cell belongs after the UE hands over from the fourth cell to the fifth cell, so that the network element to which the fifth cell belongs sends the physical identifier of the second cell to the network element to which the first cell belongs.

The UE further comprises: a reporting module, configured to report routing and addressing information of the first cell to the network element to which the fourth cell belongs, wherein when the first cell is a Long-Term Evolution (LTE) cell, the routing and addressing information comprises at least one of the following: a Global evolved NodeB Identifier (Global eNB ID) and a Tracking Area Identifier (TAI); when the first cell is a Universal Mobile Telecommunications System (UMTS) Frequency Division Duplex (FDD) cell, the routing and addressing information comprises at least one of the following: a Location Area Identifier (LAI), a Routing Area Code (RAC), a Radio Network Controller identifier (RNC-ID) and an Extended RNC-ID; when the first cell is a cell of a Global System of Mobile communications (GSM), the routing and addressing information is a Cell Global Identifier (CGI), wherein the CGI comprises at least one of the following: a Public Land Mobile Network (PLMN) identity, a Location Area Code (LAC), a Cell Identifier (CI) and an RAC.

When the second cell is an LTE cell, the physical identifier of the second cell is a Physical Cell Identifier (PCI); when the second cell is a UMTS FDD cell, the physical identifier of the second cell is a Primary Scrambling Code (PSC); when the second cell is a UMTS Time Division Duplex (TDD) cell, the physical identifier of the second cell is a Cell Parameter Identifier (Cell Parameter ID); when the second cell is a cell of a GSM, the physical identifier of the second cell is a Base Station Identity Code (BSIC).

The UE is further configured to send frequency information of the second cell to the network element to which the UE in the connected state is connected.

Through the disclosure, the second cell is identified with a physical identifier of the second cell to solve the problem that the UE can not acquire the cell global identifier (which is ECGI in the E-UTRAN) of the second cell when failure occurs during the handover procedure, which further causes the base station to which the first cell belongs can not acquire the cell global identifier (which is ECGI in the E-UTRAN) of the second cell from the UE. Therefore, the first cell is ensured to carry out accurate judgment of handover situations according to the physical identifier, which can ensure the optimization of handover parameters.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

It shall be noted that the embodiments in the application and the characteristics in the embodiments can be mutually combined if no conflict occurs. The disclosure will be illustrated hereinafter in conjunction with the exemplary embodiments and accompanying drawings.

Figure 1:
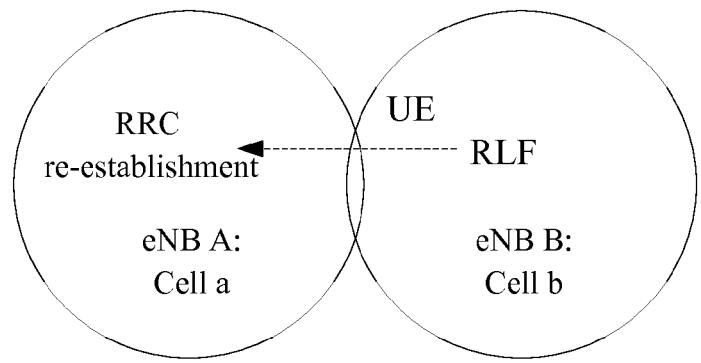
FIG. 1 is a schematic diagram of a situation that UE is too late to hand over from Cell b to Cell a according to the related art.
Figure 2:
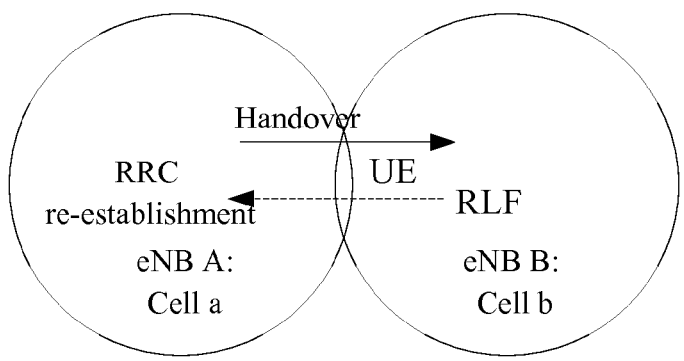
FIG. 2 is a schematic diagram of a situation that UE is too early to hand over from Cell a to Cell b according to the related art.
Figure 3:
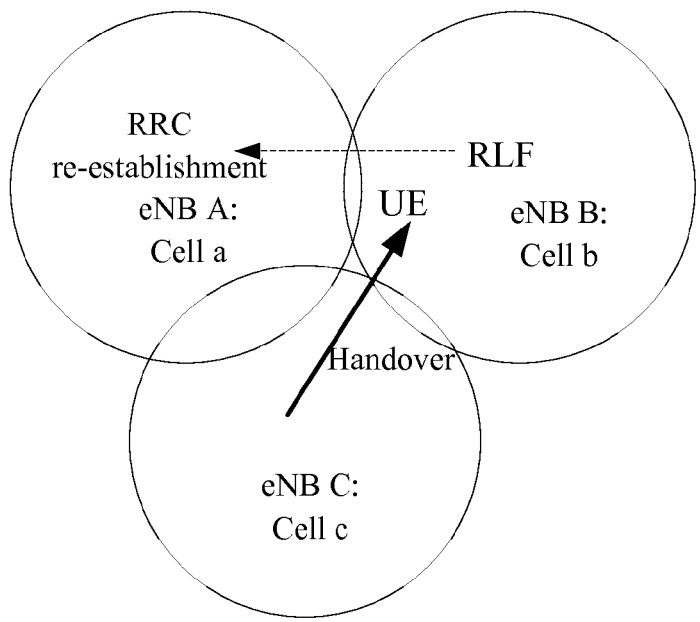
FIG. 3 is a schematic diagram of a situation that UE selects a wrong cell when handing over from Cell c to Cell b according to the related art.
Figure 4:
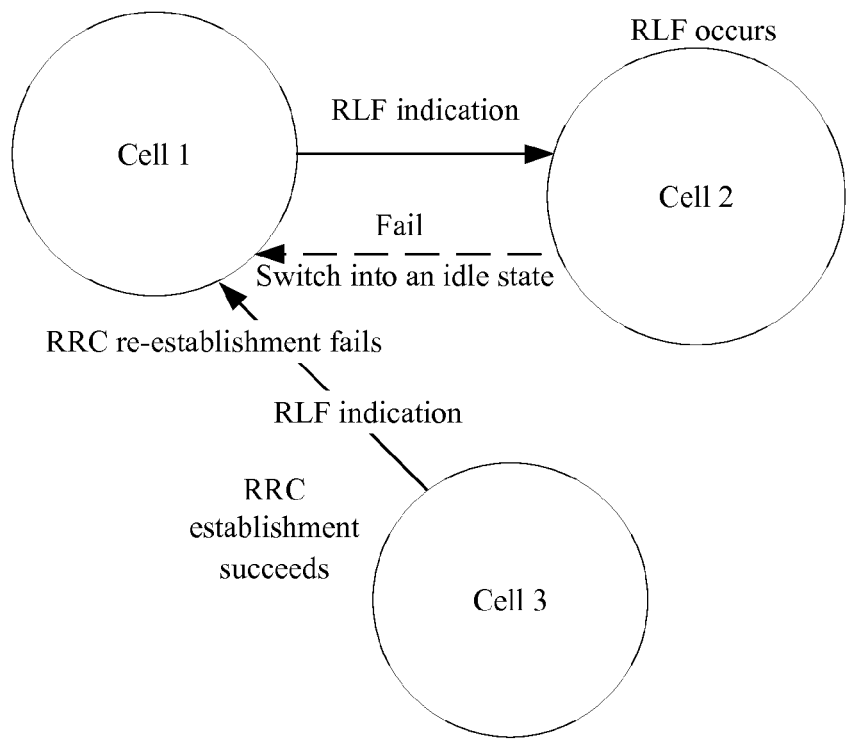
FIG. 4 is a schematic diagram of the processing of an RRC re-establishment failure according to the related art.
Figure 5:
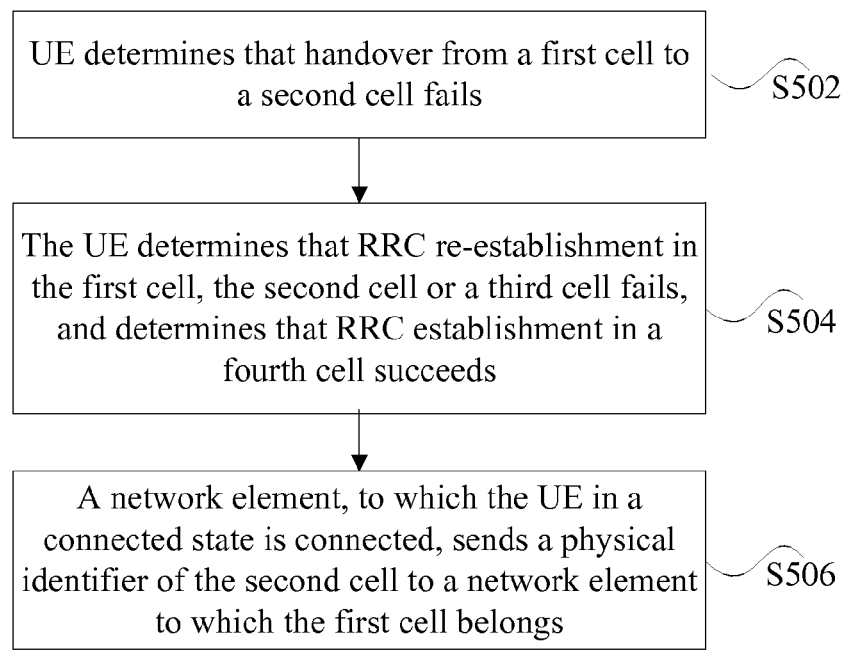
FIG. 5 is a flow chart of a method for processing handover failure according to an embodiment of the disclosure.

An embodiment of the disclosure provides a method for processing handover failure. FIG. 5 is a flow chart of the method for processing handover failure according to the embodiment of the disclosure, comprising Step S502 to Step S506.

Step S502, UE fails in handing over from a first cell to a second cell.

Step S504, the UE fails in performing radio resource control re-establishment in the first cell or the second cell or a third cell, and succeeds in performing radio resource control establishment in a fourth cell.

Step S506, a network element to which the user equipment in a connected state is connected sends a physical identifier of the second cell to a network element to which the first cell belongs.

In the related art, the UE can not acquire the cell global identifier (which is ECGI in the E-UTRAN) of the second cell when failure occurs during the handover procedure, which will cause the base station to which the first cell belongs can not acquire the cell global identifier (which is ECGI in the E-UTRAN) of the second cell from the UE. In the embodiment of the disclosure, the second cell is identified with a physical identifier of the second cell so that the first cell carries out accurate judgment of handover situations according to the physical identifier, which can ensure the optimization of handover parameters.

It shall be noted that, in the related art, the cell identifier (which is ECGI in the E-UTRAN) of the second cell that the UE can not acquire when failure occurs during the handover procedure is an identifier of a third layer; besides, at present, a number of researches focus on how to ensure an accurate acquirement of the cell identifier (ECGI) of the second cell when the UE fails in the handover. However, in the embodiment, the second cell is identified with a physical identifier of the second cell which is an identifier of a first layer; thus, an accurate cell identifier can be acquired by the UE even if the UE fails in the handover.

Preferably, the process that the network element to which the UE in the connected state is connected sends the physical identifier of the second cell to the network element to which the first cell belongs comprises: the UE reports the physical identifier of the second cell to a network element to which a fourth cell belongs; and the network element to which the fourth cell belongs sends the physical identifier of the second cell to the network element to which the first cell belongs.

In the preferable embodiment of the disclosure, after the UE succeeds in performing the RRC establishment in the fourth cell, the physical identifier of the second cell is directly sent to the network element to which the first cell belongs through the network element to which the fourth cell belongs, wherein the UE is in the connected state in the fourth cell. This implementation mode is simple and reliable, and can ensure that the first cell acquires the physical identifier of the second cell as soon as possible so as to carry out accurate judgment of handover situations.

Preferably, the UE reports routing and addressing information of the first cell to the network element to which the fourth cell belongs, wherein when the first cell is a Long-Term Evolution (LTE) cell, the routing and addressing information comprises at least one of the following: a Global evolved NodeB Identifier (Global eNB ID) and a Tracking Area Identifier (TAI); when the first cell is a Universal Mobile Telecommunications System (UMTS) Frequency Division Duplex (FDD) cell, the routing and addressing information comprises at least one of the following: a Location Area Identifier (LAI), a Routing Area Code (RAC), an RNC-ID and an Extended RNC-ID; when the first cell is a cell of a Global System of Mobile communications (GSM), the routing and addressing information is a Cell Global Identifier (CGI), wherein the CGI comprises at least one of the following: a Public Land Mobile Network (PLMN) identity, a Location Area Code (LAC), a Cell Identifier (CI) and an RAC.

In the related art, if there is no X2 interface between the network element to which the fourth cell belongs and the network element to which the first cell belongs, the network element to which the fourth cell belongs can not acquire a destination address of the network element to which the first cell belongs and consequently can not send the physical identifier of the second cell accurately. Therefore, in the preferable embodiment of the disclosure, the UE reports the routing and addressing information of the first cell to the network element to which the fourth cell belongs, and the network element to which the fourth cell belongs can send the physical identifier of the second cell accurately to the network element to which the first cell belongs after acquiring the routing and addressing information of the network element to which the first cell belongs, so that the information reported by the UE can be successfully sent via a core network even if no direct X2 interface exists between two network elements.

Preferably, the UE can report the routing and addressing information to the network element to which the fourth cell belongs while reporting the physical identifier of the second cell to the network element to which the fourth cell belongs; alternatively, the UE can report the routing and addressing information to the network element to which the fourth cell belongs when receiving a request message from the network element to which the fourth cell belongs.

Preferably, the process that the network element to which the UE in the connected state is connected sends the physical identifier of the second cell to the network element to which the first cell belongs comprises: the UE hands over from the fourth cell to a fifth cell; the UE reports the physical identifier of the second cell to a network element to which the fifth cell belongs; and the network element to which the fifth cell belongs sends the physical identifier of the second cell to the network element to which the first cell belongs.

In the related art, it is possible that the network element to which the fourth cell belongs does not support the reporting of the physical identifier of the second cell, or the network element, to which the fourth cell belongs, does not request the UE to report the physical identifier of the second cell for some reason. Therefore, in the preferable embodiment of the disclosure, after the UE hands over from the fourth cell to the fifth cell, the physical identifier of the second cell is sent to the network element to which the first cell belongs through the network element which is in the connected state in the fifth cell. This implementation mode can ensure the accurate reporting of the physical identifier of the second cell to the maximum extent so as to ensure that the first cell acquires the physical identifier of the second cell and carry out accurate judgment of handover situations.

Preferably, the UE reports routing and addressing information of the first cell to the network element to which the fifth cell belongs, wherein when the first cell is an LTE cell, the routing and addressing information comprises at least one of the following: a Global eNB ID and a TAI; when the first cell is a UMTS FDD cell, the routing and addressing information comprises at least one of the following: a LAI, a RAC, an RNC-ID and an Extended RNC-ID; when the first cell is a cell of a GSM, the routing and addressing information is a CGI, wherein the CGI comprises at least one of the following: a PLMN identity, an LAC, a CI and an RAC.

In the related art, if there is no X2 interface between the network element to which the fifth cell belongs and the network element to which the first cell belongs, the network element to which the fifth cell belongs can not acquire a destination address of the network element to which the first cell belongs and consequently can not send the physical identifier of the second cell accurately. Therefore, in the preferable embodiment of the disclosure, the UE reports the routing and addressing information of the first cell to the network element to which the fifth cell belongs, and the network element to which the fifth cell belongs can send the physical identifier of the second cell accurately to the network element to which the first cell belongs after acquiring the routing and addressing information of the network element to which the first cell belongs, so that the information reported by the UE can be successfully sent via a core network even if no direct X2 interface exists between two network elements.

Preferably, the UE can report the routing and addressing information to the network element to which the fifth cell belongs while reporting the physical identifier of the second cell to the network element to which the fifth cell belongs; alternatively, the UE can report the routing and addressing information to the network element to which the fifth cell belongs when receiving a request message from the network element to which the fifth cell belongs.

Preferably, when the second cell is an LTE cell, the physical identifier of the second cell is a Physical Cell Identifier (PCI); when the second cell is a UMTS FDD cell, the physical identifier of the second cell is a Primary Scrambling Code (PSC); when the second cell is a UMTS Time Division Duplex (TDD) cell, the physical identifier of the second cell is a Cell Parameter Identifier (Cell Parameter ID); when the second cell is a cell of a GSM, the physical identifier of the second cell is a Base Station Identity Code (BSIC).

The physical identifier is detailed by the preferable embodiment of the disclosure. It shall be noted that, in actual applications, it is not limited to the physical identifier above. Any identifier that can be acquired and sent by the UE, and can be used for unique identification of the second cell shall fall within the protection scope of the disclosure.

Preferably, the UE in the connected state sends frequency information of the second cell to the network element to which the UE in the connected state is connected, and the network element to which the UE in a connected state is connected sends the frequency information of the second cell to the network element to which the first cell belongs.

The network element to which the UE in the connected state is connected comprises one of the following: the network element to which the fourth cell belongs; the network element to which the fifth cell belongs when the UE succeeds in handing over from the fourth cell to the fifth cell.

The implementation process of the embodiments of the disclosure will be further illustrated hereinafter in conjunction with examples.

Preferable Embodiment 1

Preferable Embodiment 1 describes judgment of a situation of handover to a wrong cell.

Figure 6:
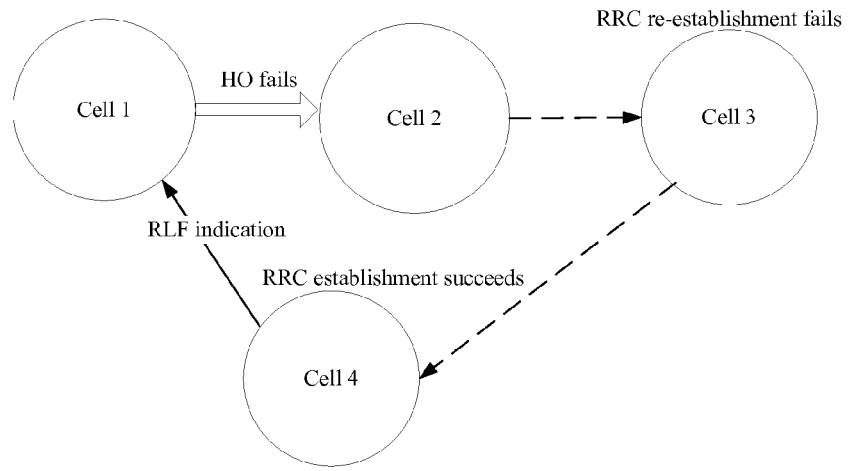
FIG. 6 is a schematic diagram of handover to a wrong cell according to an embodiment of the disclosure.

FIG. 6 is a schematic diagram of handover to a wrong cell according to the embodiment of the disclosure.

The UE conducts handover from Cell 1 to Cell 2; however, failure occurs during the handover procedure. Subsequently, the UE selects to make an attempt to perform RRC re-establishment in Cell 3; however, the RRC re-establishment attempt fails for some reason. After failing in the RRC re-establishment attempt, the UE switches into an idle state, and subsequently initiates and succeeds in RRC establishment in Cell 4.

The UE reports RLF-related information in Cell 4. Network Element 4 forwards the RLF-related information to Network Element 1 after receiving the RLF-related information reported by the UE.

The RLF-related information herein comprises a PCI and/or ECGI of Cell 1, a physical identifier of Cell 2. Preferably, the RLF-related information may also comprise one or multiple items of frequency information of Cell 2, a PCI and/or ECGI of Cell 3, a C-RNTI and/or short MAC-I carried by the UE during the RRC re-establishment, and RLF-related measurement information, etc.

When the second cell is an LTE cell, the physical identifier of the second cell is a PCI; when the second cell is a UMTS FDD cell, the physical identifier of the second cell is a PSC; when the second cell is a UMTS TDD cell, the physical identifier of the second cell is a Cell Parameter ID; when the second cell is a cell of the GSM, the physical identifier of the second cell is a BSIC.

The RLF-related measurement information herein refers to: measurement results of the signal quality of a best surrounding cell and a serving cell before the RLF occurs, wherein the measurement results of the signal quality are recorded by the UE. The RLF-related measurement information can also comprise measurement results of the signal quality of the serving cell and the best surrounding cell measured by the UE when the UE initiates the re-establishment subsequently, or can also comprise location information of the UE.

In the above, a message adopted by the UE for reporting the RLF-related information may be an RRC re-establishment request message or an RRC re-establishment completion message or a UE Information Response message or other uplink messages. The UE can report the information above to the network side in different messages.

Furthermore, the UE can report an instruction, which is used for indicating that there is RLF-related information, in an uplink message, and the network side determines whether the UE reports the RLF-related information or not. If the network side determines that the UE needs to report the RLF-related information, the network side sends a request message to request the UE to report the RLF-related information.

Network Element 4 sends the RLF-related information reported by the UE to Network Element 1 which can judge whether a coverage hole exists based on the RLF-related measurement information. For example, if the signal quality of the serving cell and the best surrounding cell is relatively bad, it indicates that a coverage hole may exist. If no coverage hole exists, it can be judged that a wrong handover from Cell 1 to Cell 2 has occurred once, and a right target cell of the handover is Cell 3. During the procedure that Network Element 4 sends the RLF-related information to Network Element 1, if there is no direct interface between Network Element 4 and Network Element 1, Network Element 4 can not acquire the destination address of Network Element 1, so Network Element 4 can not send the RLF-related information accurately. The UE can carry routing and addressing information of Network Element 1 in RLF information; or Network Element 4 can request the UE to report the routing and addressing information of Network Element 1. After acquiring the routing and addressing information of Network Element 1, Network Element 4 can send the RLF-related information to Network Element 1 accurately.

The routing and addressing information herein refers to:
when the network element is an eNB of the LTE, the addressing information comprises a Global eNB ID and Selected TAI information, or other information which can comprise the contents;
when the network element is a radio network controller (RNC) in the UMTS, the addressing information comprises one or multiple items of an LAI, an RAC, an RNC-ID and an Extended RNC-ID;
when the network element is a base station controller in the GSM, the addressing information refers to a CGI which consists of a PLMN identity, an LAC, a CI and an RAC (optional).

Furthermore, if Network Element 4 does not support the reporting of the RLF information or does not request the UE to report the RLF information for other reasons, the UE can report the RLF information when handing over from Network Element 4 to another network element. For example, the UE reports the RLF information in Cell 5, and the UE may also report the routing and addressing information.

Network Element 5 can send the RLF information above to Network Element 1 so that Network Element 1 can carry out the judgment of handover situations.

Preferable Embodiment 2

Preferable Embodiment 2 describes judgment of a situation of too early handover.

Figure 7:
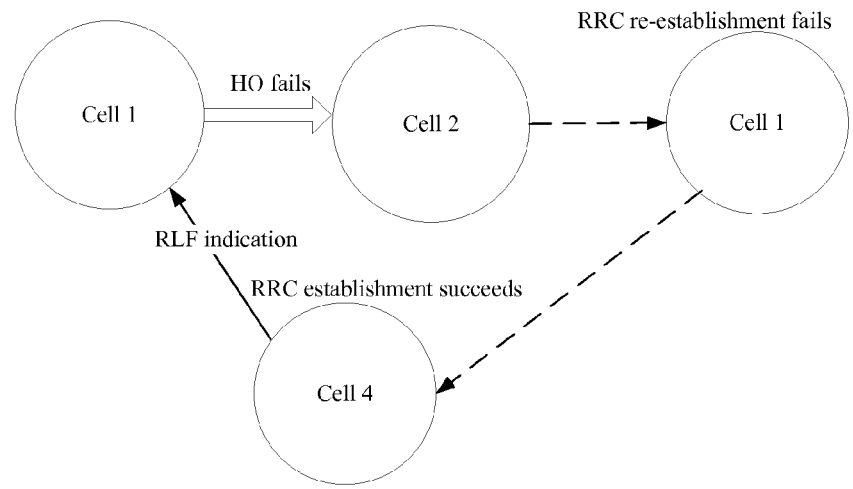
FIG. 7 is a schematic diagram of too early handover according to an embodiment of the disclosure.

FIG. 7 is a schematic diagram of too early handover according to the embodiment of the disclosure.

The UE conducts handover from Cell 1 to Cell 2; however, failure occurs during the handover procedure. Subsequently, the UE selects to make an attempt to perform RRC re-establishment in Cell 1; however, the RRC re-establishment attempt fails for some reason. After failing in the RRC re-establishment attempt, the UE switches into an idle state, and subsequently initiates and succeeds in RRC establishment in Cell 4.

The UE reports RLF-related information in Cell 4. Network Element 4 forwards the RLF-related information to Network Element 1 after receiving the RLF-related information reported by the UE.

The RLF-related information herein comprises a PCI and/or ECGI of Cell 1, a physical identifier of Cell 2. Preferably, the RLF-related information may also comprise one or multiple items of frequency information of Cell 2, a C-RNTI and/or short MAC-I carried by the UE during the RRC re-establishment, and RLF-related measurement information, etc.

The physical identifier of Cell 2 herein refers to a PCI (when Cell 2 is an LTE cell), a primary scrambling code (when Cell 2 is a UMTS FDD cell), a Cell Parameter ID (when Cell 2 is a UMTS TDD cell) and a BSIC (when Cell 2 is a GSM cell).

The RLF-related measurement information herein refers to: measurement results of the signal quality of a best surrounding cell and a serving cell before the RLF occurs, wherein the measurement results of the signal quality are recorded by the UE. The RLF-related measurement information can also comprise measurement results of the signal quality of the serving cell and the best surrounding cell measured by the UE when the UE initiates the re-establishment subsequently, or can also comprise location information of the UE.

In the above, a message adopted by the UE for reporting the RLF-related information may be an RRC re-establishment request message or an RRC re-establishment completion message or a UE Information Response message or other uplink messages. The UE can report the information above to the network side in different messages.

Furthermore, the UE can report an instruction, which is used for indicating that there is RLF-related information, in an uplink message, and the network side determines whether the UE reports the RLF-related information or not. If the network side determines that the UE needs to report the RLF-related information, the network side sends a request message to request the UE to report the RLF-related information.

Network Element 4 sends the RLF-related information reported by the UE to Network Element 1 which can judge whether a coverage hole exists based on the RLF-related measurement information. For example, if the signal quality of the serving cell and the best surrounding cell is relatively bad, it indicates that a coverage hole may exist. If no coverage hole exists, it can be judged that a wrong handover from Cell 1 to Cell 2 has occurred once, and a right target cell of the handover is Cell 3. During the procedure that Network Element 4 sends the RLF-related information to Network Element 1, if there is no direct interface between Network Element 4 and Network Element 1, Network Element 4 can not acquire the destination address of Network Element 1, so Network Element 4 can not send the RLF-related information accurately. The UE can carry routing and addressing information of Network Element 1 in RLF information; or Network Element 4 can request the UE to report the routing and addressing information of Network Element 1. After acquiring the routing and addressing information of Network Element 1, Network Element 4 can send the RLF-related information to Network Element 1 accurately.

The routing and addressing information herein refers to:
when the network element is an eNB of the LTE, the addressing information comprises a Global eNB ID and Selected TAI information, or other information which can comprise the contents;
when the network element is a radio network controller (RNC) in the UMTS, the addressing information comprises one or multiple items of an LAI, an RAC, an RNC-ID and an Extended RNC-ID;
when the network element is a base station controller in the GSM, the addressing information refers to a CGI which consists of a PLMN identity, an LAC, a CI and an RAC (optional).

Furthermore, if Network Element 4 does not support the reporting of the RLF information or does not request the UE to report the RLF information for other reasons, the UE can report the RLF information when handing over from Network Element 4 to another network element. For example, the UE reports the RLF information in Cell 5, and the UE may also report the routing and addressing information.

Network Element 5 can send the RLF information above to Network Element 1 so that Network Element 1 can carry out the judgment of handover situations.

Preferable Embodiment 3

Preferable Embodiment 3 describes judgment of a situation of too late handover.

Figure 8:
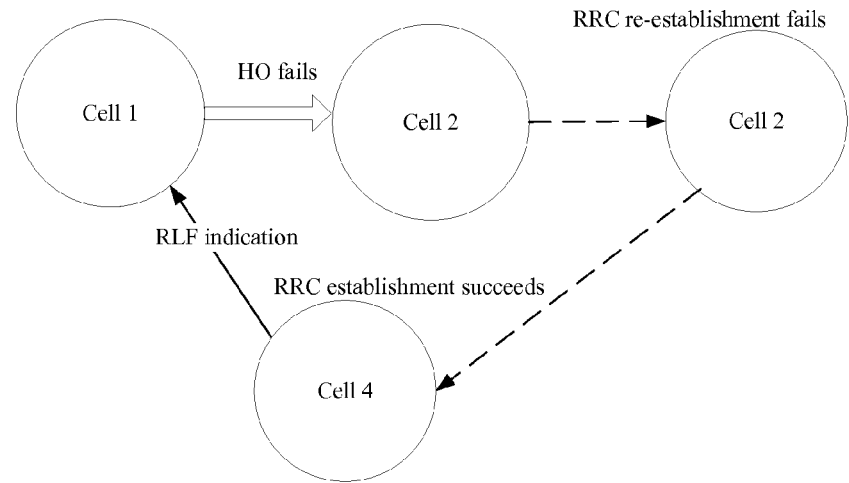
FIG. 8 is a schematic diagram of too late handover according to an embodiment of the disclosure.

FIG. 8 is a schematic diagram of too late handover according to the embodiment of the disclosure.

The UE conducts handover from Cell 1 to Cell 2; however, failure occurs during the handover procedure. Subsequently, the UE selects to make an attempt to perform RRC re-establishment in Cell 2; however, the RRC re-establishment attempt fails for some reason. After failing in the RRC re-establishment attempt, the UE switches into an idle state, and subsequently initiates and succeeds in RRC establishment in Cell 4.

The UE reports RLF-related information in Cell 4. Network Element 4 forwards the RLF-related information to Network Element 1 after receiving the RLF-related information reported by the UE.

The RLF-related information herein comprises one or multiple items of a PCI and/or ECGI of Cell 1, a PCI and/or ECGI of Cell 2, a C-RNTI and/or short MAC-I carried by the UE during the RRC re-establishment and RLF-related measurement information, etc.

The RLF-related measurement information herein refers to: measurement results of the signal quality of a best surrounding cell and a serving cell before the RLF occurs, wherein the measurement results of the signal quality are recorded by the UE. The RLF-related measurement information can also comprise measurement results of the signal quality of the serving cell and the best surrounding cell measured by the UE when the UE initiates the re-establishment subsequently, or can also comprise location information of the UE.

In the above, a message adopted by the UE for reporting the RLF-related information may be an RRC re-establishment request message or an RRC re-establishment completion message or a UE Information Response message or other uplink messages. The UE can report the information above to the network side in different messages.

Furthermore, the UE can report an instruction, which is used for indicating that there is RLF-related information, in an uplink message, and the network side determines whether the UE reports the RLF-related information or not. If the network side determines that the UE needs to report the RLF-related information, the network side sends a request message to request the UE to report the RLF-related information.

Network Element 4 sends the RLF-related information reported by the UE to Network Element 1 which can judge whether a coverage hole exists based on the RLF-related measurement information. For example, if the signal quality of the serving cell and the best surrounding cell is relatively bad, it indicates that a coverage hole may exist. If no coverage hole exists, it can be judged that a wrong handover from Cell 1 to Cell 2 has occurred once, and a right target cell of the handover is Cell 3. During the procedure that Network Element 4 sends the RLF-related information to Network Element 1, if there is no direct interface between Network Element 4 and Network Element 1, Network Element 4 can not acquire the destination address of Network Element 1, so Network Element 4 can not send the RLF-related information accurately. The UE can carry routing and addressing information of Network Element 1 in RLF information; or Network Element 4 can request the UE to report the routing and addressing information of Network Element 1. After acquiring the routing and addressing information of Network Element 1, Network Element 4 can send the RLF-related information to Network Element 1 accurately.

The routing and addressing information herein refers to:
when the network element is an eNB of the LTE, the addressing information comprises a Global eNB ID and Selected TAI information, or other information which can comprise the contents;
when the network element is a radio network controller (RNC) in the UMTS, the addressing information comprises one or multiple items of an LAI, an RAC, an RNC-ID and an Extended RNC-ID;
when the network element is a base station controller in the GSM, the addressing information refers to a CGI which consists of a PLMN identity, an LAC, a CI and an RAC (optional).

Furthermore, if Network Element 4 does not support the reporting of the RLF information or does not request the UE to report the RLF information for other reasons, the UE can report the RLF information when handing over from Network Element 4 to another network element. For example, the UE reports the RLF information in Cell 5, and the UE may also report the routing and addressing information.

Network Element 5 can send the RLF information above to Network Element 1 so that Network Element 1 can carry out the judgment of handover situations.

The RLF-related measurement information in the embodiments above refers to: one or multiple items of measurement results of the signal quality of a best surrounding cell and a serving cell before the RLF occurs, measurement results of the signal quality of the serving cell and the best surrounding cell measured by the UE when the UE initiates the re-establishment subsequently, and location information of the UE.

The network element refers to an eNodeB, an RNC and a BSC corresponding to an LTE system, a UMTS system and a GSM system respectively.

It shall be noted that the steps shown in the flow charts of the figures can be carried out in a group of computer systems of which the computers are capable of executing instructions. In addition, although the flow charts show a logical sequence, in some cases, the steps shown or described herein can be carried out in other sequences.

Figure 9:
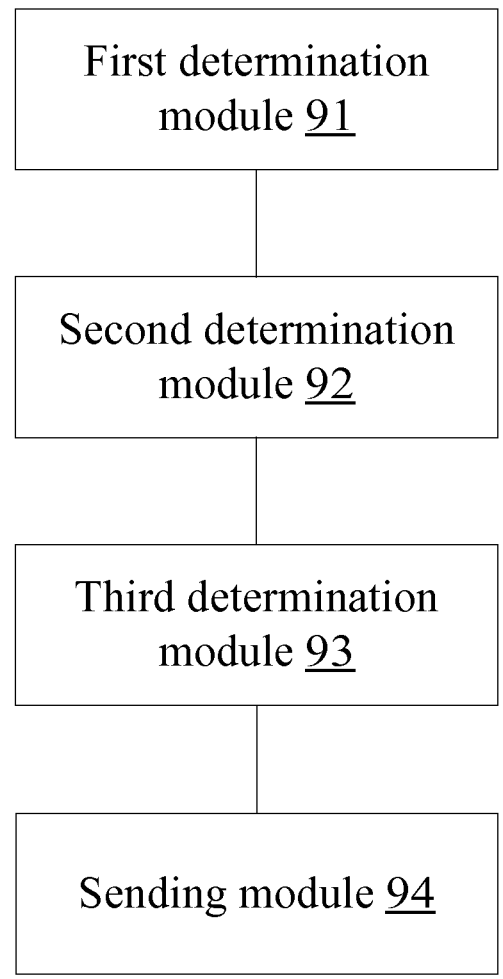
FIG. 9 is a structural block diagram of UE according to an embodiment of the disclosure.

An embodiment of the disclosure provides UE which can be used to realize the method for processing handover failure above. FIG. 9 is a structural block diagram of the UE according to the embodiment of the disclosure. As shown in FIG. 9, the UE comprises a first determination module 91, a second determination module 92, a third determination module 93 and a sending module 94. The structure will be detailed hereinafter.

The first determination module 91 is configured to determine that handover from a first cell to a second cell fails; the second determination module 92 is coupled with the first determination module 91 and configured to, after the first determination module 91 determines that the handover from the first cell to the second cell fails, determine that RRC re-establishment in the first cell or the second cell or a third cell fails; the third determination module 93 is coupled with the second determination module 92 and configured to, after the second determination module 92 determines that the RRC re-establishment in the first cell or the second cell or the third cell fails, determine that RRC establishment in a fourth cell succeeds; the sending module 94 is coupled with the third determination module 93 and configured to, after the third determination module 93 determines that the RRC establishment in the fourth cell succeeds, send a physical identifier of the second cell to a network element, to which the UE in a connected state is connected.

In the related art, the UE can not acquire the cell global identifier (which is ECGI in the E-UTRAN) of the second cell when failure occurs during the handover procedure, which will cause the base station to which the first cell belongs can not acquire the cell global identifier (which is ECGI in the E-UTRAN) of the second cell from the UE. In the embodiment of the disclosure, the second cell is identified with a physical identifier of the second cell so that the first cell carries out accurate judgment of handover situations according to the physical identifier, which can ensure the optimization of handover parameters.

Preferably, the sending module 94 comprises a reporting sub-module 941, coupled with the third determination module 93 and configured to, after the third determination module 93 determines that the RRC establishment in the fourth cell succeeds, send the physical identifier of the second cell to a network element to which the fourth cell belongs, so that the fourth cell sends the physical identifier of the second cell to the first cell.

In the preferable embodiment of the disclosure, after the UE succeeds in performing the RRC establishment in the fourth cell, the physical identifier of the second cell is directly sent to the network element to which the first cell belongs through the network element to which the fourth cell belongs, wherein the UE is in the connected state in the fourth cell. This implementation mode is simple and reliable, and can ensure that the first cell acquires the physical identifier of the second cell as soon as possible so as to carry out accurate judgment of handover situations.

Preferably, the UE above further comprises a reporting module 95, configured to report routing and addressing information of the first cell to the network element to which the fourth cell belongs, wherein when the first cell is a Long-Term Evolution (LTE) cell, the routing and addressing information comprises at least one of the following: a Global evolved NodeB Identifier (Global eNB ID) and a Tracking Area Identifier (TAI); when the first cell is a Universal Mobile Telecommunications System (UMTS) Frequency Division Duplex (FDD) cell, the routing and addressing information comprises at least one of the following: a Location Area Identifier (LAI), a Routing Area Code (RAC), an RNC-ID and an Extended RNC-ID; when the first cell is a cell of a Global System of Mobile communications (GSM), the routing and addressing information is a Cell Global Identifier (CGI), wherein the CGI comprises at least one of the following: a Public Land Mobile Network (PLMN) identity, a Location Area Code (LAC), a Cell Identifier (CI) and an RAC.

In the related art, if there is no X2 interface between the network element to which the fourth cell belongs and the network element to which the first cell belongs, the network element to which the fourth cell belongs can not acquire a destination address of the network element to which the first cell belongs and consequently can not send the physical identifier of the second cell accurately. Therefore, in the preferable embodiment of the disclosure, the UE reports the routing and addressing information of the first cell to the network element to which the fourth cell belongs, and the network element to which the fourth cell belongs can send the physical identifier of the second cell accurately to the network element to which the first cell belongs after acquiring the routing and addressing information of the network element to which the first cell belongs, so that the information reported by the UE can be successfully sent via a core network even if no direct X2 interface exists between two network elements.

Preferably, when the second cell is an LTE cell, the physical identifier of the second cell is a Physical Cell Identifier (PCI); when the second cell is a UMTS FDD cell, the physical identifier of the second cell is a Primary Scrambling Code (PSC); when the second cell is a UMTS Time Division Duplex (TDD) cell, the physical identifier of the second cell is a Cell Parameter Identifier (Cell Parameter ID); when the second cell is a cell of a GSM, the physical identifier of the second cell is a Base Station Identity Code (BSIC).

The physical identifier is detailed by the preferable embodiment of the disclosure. It shall be noted that, in actual applications, it is not limited to the physical identifier above. Any identifier that can be acquired and sent by the UE, and can be used for unique identification of the second cell shall fall within the protection scope of the disclosure.

Preferably, the network element to which the UE in a connected state is connected sends frequency information of the second cell to the network element to which the first cell belongs.

It shall be noted that the UE described in the embodiment of the device corresponds to the embodiment of the method above. The specific implementation process has been detailed in the embodiment of the method, so no details will be given herein.

To sum up, according to the embodiments of the disclosure, user equipment and a method for processing handover failure are provided. The second cell is identified with a physical identifier of the second cell to solve the problem that the UE can not acquire the cell global identifier (which is ECGI in the E-UTRAN) of the second cell when failure occurs during the handover procedure, which further causes the base station to which the first cell belongs can not acquire the cell global identifier (which is ECGI in the E-UTRAN) of the second cell from the UE. Therefore, the first cell is ensured to carry out accurate judgment of handover situations according to the physical identifier, which can ensure the optimization of handover parameters.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for processing handover failure, comprising:
sending, by a network element to which User Equipment (UE) in a connected state is connected, a physical identifier of a second cell to a network element to which a first cell belongs;
wherein before sending the physical identifier of the second cell to the network element to which the first cell belongs, the method comprises: the UE failing in handing over from the first cell to the second cell; and the UE failing in performing Radio Resource Control (RRC) re-establishment in the first cell, the second cell or a third cell, and succeeding in performing RRC establishment in a fourth cell;
wherein sending, by the network element to which the UE in the connected state is connected, the physical identifier of the second cell to the network element to which the first cell belongs comprises:
handing over, by the UE, from the fourth cell to a fifth cell;
reporting, by the UE, the physical identifier of the second cell to a network element to which the fifth cell belongs; and sending, by the network element which the fifth cell belongs, the physical identifier of the second cell to the network element to which the first cell belongs.

2. The method as claimed in claim 1, wherein sending, by the network element to which the UE in the connected state is connected, the physical identifier of the second cell to the network element to which the first cell belongs further comprises:
reporting, by the UE, the physical identifier of the second cell to a network element to which the fourth cell belongs; and
sending, by the network element to which the fourth cell belongs, the physical identifier of the second cell to the network element to which the first cell belongs.

3. The method as claimed in claim 1, wherein the UE further reports routing and addressing information of the first cell to the network element to which the fifth cell belongs.

4. The method as claimed in claim 1, wherein
when the second cell is an LTE cell, the physical identifier of the second cell is a Physical Cell Identifier (PCI);
when the second cell is a UMTS FDD cell, the physical identifier of the second cell is a Primary Scrambling Code (PSC);
when the second cell is a UMTS Time Division Duplex (TDD) cell, the physical identifier of the second cell is a Cell Parameter Identifier (Cell Parameter ID);
when the second cell is a cell of a GSM, the physical identifier of the second cell is a Base Station Identity Code (BSIC).

5. The method as claimed in claim 1, wherein the UE in the connected state sends frequency information of the second cell to the network element to which the UE in the connected state is connected, and the network element to which the UE in the connected state is connected sends the frequency information of the second cell to the network element to which the first cell belongs.

6. The method as claimed in claim 2, wherein the UE in the connected state sends frequency information of the second cell to the network element to which the UE in the connected state is connected, and the network element to which the UE in the connected state is connected sends the frequency information of the second cell to the network element to which the first cell belongs.

7. The method as claimed in claim 1, wherein the network element to which the UE in the connected state is connected comprises:
a network element to which the fourth cell belongs; or
a network element to which a fifth cell belongs when the UE succeeds in handing over from the fourth cell to the fifth cell.

8. A network element, wherein the network element, to which User Equipment (UE) in a connected state is connected, comprises a hardware processor and memory, wherein the hardware processor is configured to execute program units stored on the memory, the program units comprising:
a first sending unit configured to send a physical identifier of a second cell to a network element to which a first cell belongs;
wherein the first sending is configured to send the physical identifier of the second cell to the network element to which the first cell belongs in following conditions: the UE failing in handing over from the first cell to the second cell; and the UE failing in performing Radio Resource Control (RRC) re-establishment in the first cell, the second cell or a third cell, and succeeding in performing RRC establishment in a fourth cell;
wherein the network element to which the UE in the connected state is connected comprises:
a network element to which a fifth cell belongs when the UE succeeds in handing over from the fourth cell to the fifth cell.

9. The network element as claimed in claim 8, wherein the program units comprise:
a first receiving unit configured to receive the physical identifier of the second cell sent from the UE in the connected state, and the first sending unit is configured to send the physical identifier of the second cell to the network element to which the first cell belongs.

10. The network element as claimed in claim 8, wherein the program units comprise:
a second receiving unit configured to receive frequency information of the second cell sent from the UE in the connected state; and
a second sending unit configured to send the frequency information of the second cell to the network element to which the first cell belongs.

11. The network element as claimed in claim 8, characterized in that the network element to which the UE in the connected state is connected further comprises:
a network element to which the fourth cell belongs.

12. The network element as claimed in claim 9, characterized in that the network element to which the UE in the connected state is connected further comprises:
a network element to which the fourth cell belongs.

13. The network element as claimed in claim 10, characterized in that the network element to which the UE in the connected state is connected further comprises:
a network element to which the fourth cell belongs.

* * * * *

UNITED STATES PATENT AND TRADEMARK OFFICE
CERTIFICATE OF CORRECTION

| | | |
|---|---|---|
| PATENT NO. | : 9,326,192 B2 | |
| APPLICATION NO. | : 13/825015 | |
| DATED | : April 26, 2016 | |
| INVENTOR(S) | : Han et al. | |

It is certified that error appears in the above-identified patent and that said Letters Patent is hereby corrected as shown below:

In the claims,
Column 18, line 10
Replace "wherein the first sending is configured"
with --wherein the first sending unit is configured--.

Signed and Sealed this
Twelfth Day of July, 2016

Michelle K. Lee
*Director of the United States Patent and Trademark Office*